Aug. 26, 1969     A. B. SKROMME ET AL     3,462,975

SHIELDING MECHANISM

Filed April 6, 1967

INVENTORS.
A. B. SKROMME
E. A. HENNINGSEN
J. E. HOFFMAN JR.

BY William A. Murray

ATTORNEY

United States Patent Office 3,462,975
Patented Aug. 26, 1969

3,462,975
SHIELDING MECHANISM
Arnold Burton Skromme, Moline, Etlar August Henningsen, Geneseo, and John E. Hoffman, Jr., Moline, Ill., assignors to Deere & Company, Moline, Ill., a corporation of Delaware
Filed Apr. 6, 1967, Ser. No. 628,966
Int. Cl. F16d *3/84*
U.S. Cl. 64—32                                                4 Claims

ABSTRACT OF THE DISCLOSURE

A shielding device for a universally articulated joint connecting two rotatable shafts and comprising a first spherical shield section mounted to articulate with one of the shafts, a second spherical shield section mounted to articulate with the second of the shafts, the two shield sections opening toward one another with one being smaller than the other so that it may move internally of the other, and a third spherical shield section disposed within the radial gap between the other shield sections whereby a portion of the third section will underlie a larger of the spherical shield sections and overlie the smaller of the spherical shield sections.

BACKGROUND OF THE INVENTION

This invention relates to shields used on power take-off shafts and more particularly to shields that are used over the articulated joint of the power take-off shaft.

Previously shielding devices that extended over the universal joint of a power take-off shaft comprised a bell-shaped shield connected to one part or shaft that partially overlay the universal joint and a second bell-shaped crank fixed to the other of the parts or shafts that also partially overlay the universal joint. The bell-shaped shields open to one another and one of the shields is smaller than the other so that it may recess within the other upon the two parts or shafts being at a relatively acute angle relative to one another. So long as the two shafts are axially aligned, the two shield generally completely shield the power take-off shaft. However, upon the tractor on which the power take-off shaft is mounted shifting to one side of the trailing implement, on which the opposite end of the power take-off shaft is mounted, the angle between the two shafts becomes smaller and consequently there exists a gap between the edges of the two bell-shaped shields. Normally sharp turns in both moving forwardly and rearwardly occur when the tractor is in a barnyard or cramped quarters. The gap existing over the universal joint does create a safety hazard and this hazard occurs in an area most likely to have people around that may reach their hand or arm into the vicinity of the shield. As a result, it is believed a very hazardous condition does exist.

SUMMARY OF THE INVENTION

With the above in mind it is the primary object of the invention to provide a new and novel shielding device that shields the universal joint on a power take-off shaft so that substantially at all working angles between the two joined shafts, the joint is completely shielded.

Specifically it is the purpose of the present invention to provide a first spherical or bell-shaped shield section mounted to articulate with one of the rotatable shafts of the power take-off shaft structure and a second sphercial or bell-shaped shield section adapted to articulate with the other of the rotatable shafts. A third shield is disposed in a gap between the two aforementioned shields and the third shield is composed of a sphercial shield sector that includes a major circle of the respective sphere. The latter or third shield engages the outer surface of one of the bell-shaped shields and the inner surface of the larger or other bell-shaped shield. Consequently since the third shield includes the major circle of the sphere it will be held between the two bell-shaped or spherical shield sections. It will, however, be permitted to float between the two sections. The third shield section or sector has opposite edges that engage the shafts or the shield tubes over the shafts as the respective shafts reach a sharp angle relative to one another. Consequently the third shield shifts. As will become clearly evident, the third shield will shift to close the gap left by the bell-shaped shields.

DESCRIPTION OF THE PREFERRED EMBODIMENT

Figure 1:
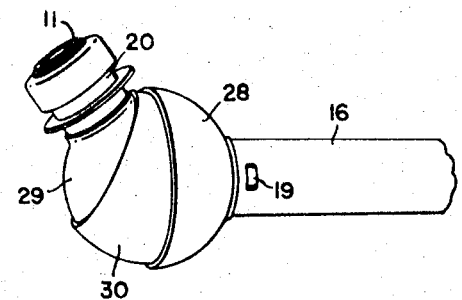
FIG. 1 is a perspective view of one end of a power take-off shaft structure.

A pair of rotatable parts or shaft elements 10, 11 are joined together by an articulated universal joint. The joint includes a pair of yoke members 13, 14 interconnected by a conventional type spider 15 to swivel relative to one another and about a point at the goemetrical center of the spider. A shield 16 surrounds the shaft 10. A yoke sleeve 17 is fixed to the shaft 10 and rotates therewith. The sleeve 17 has an annular groove 18 on its outer surface that receives a nylon bearing 19 that is fixed to the sleeve 16. The exact method of attachment of the shielding sleeve 16 to the bearing 19 is shown in U.S. Patent 2,772,550. A shield 20 is provided outside of the rotatable member 11. The shield 20 has internal annular grooves 22 opposite external annular grooves 23 in the surface of the member 11. Seated in the grooves 22, 23 are annular nylon bearings 24. The bearings 19 and 24 permit relative rotation between the shields 16 and 20 with the respective rotatable members 10, 11.

Figure 2:
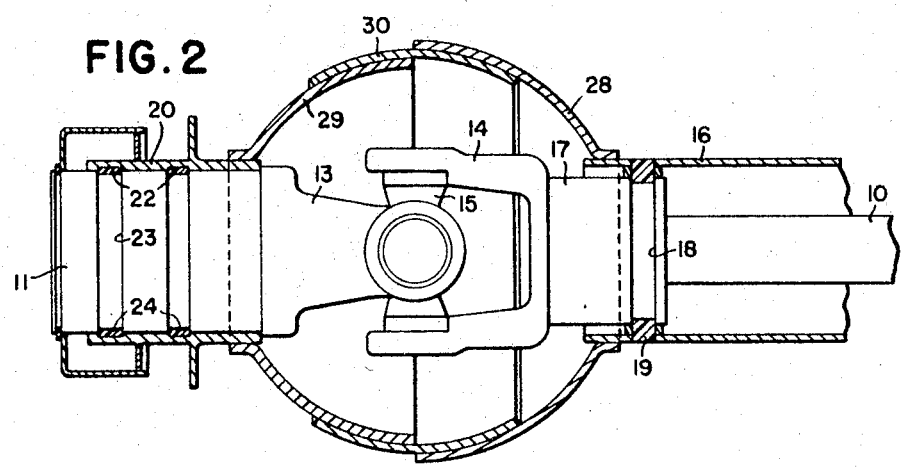
FIG. 2 is a vertical sectional view through the shielding device and universal joint of the power take-off shaft structure.

Extending over the articulated universal joint is a shield device that includes a first spherical shield section 28 fixed to the end of the shield 16 and a second spherical shield section 29 fixed to the end of the shield 20. The spherical shield sections 28, 29 are normally referred to as bell-shaped shields. The spherical portions are formed about an axis at the center of the spider 15 with the shield 29 being slightly smaller than the shield 28 to provide a slight radial gap between its outer surface and the inner surface of the shield section 28. As may be obvious from viewing FIGS. 2 and 3, the spherical shield sections 28, 29 open toward one another and each partially covers the universal joint 12.

Disposed in the gap between the outer surface of the shield section 29 and the inner surface of the shield section 28 is a third spherical shield section 30. The sphere section 30 is a sector of a sphere that includes the major axis of that sphere. It also is formed about a point at the center of the spider 15. The outer surface of the spherical section 30 slidably engages the inner surface of the spherical section 28 and the inner surface slidably engages the outer surface of the spherical section 29. The section 30 extends to opposite sides of the major circle of the sphere substantially 30°.

Figure 3:
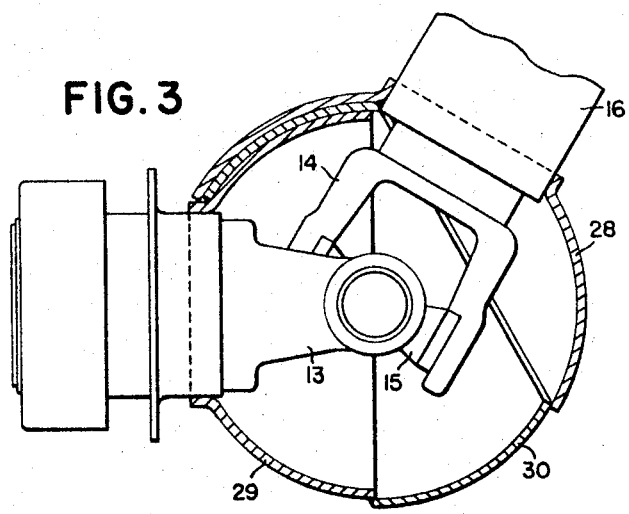
FIG. 3 is a view somewhat similar to FIG. 2, showing less structure in section, and also showing the shafts of the power take-off structure at comparatively sharp angles relative to one another.

In operation, the third shield section 30 operates to close the gap between edges of the shields 28, 29 upon the shaft 10 moving out of axial alignment with the shaft part 11. Such a condition is shown in FIG. 3. As may be readily appreciated, the shield sector 30 is permitted to float between the shield sections 28, 29. Upon the shield 16 moving at a large angle relative to the shield 20, the inner end of the shield 16 will contact the edge of the shield 30 and tend to shift it so that on one side the three shields 28, 29 and 30 are nested, as shown in FIG. 3, and on the opposite side the three shields 28, 29 and 30 are extended to their maximum position. Thus, a large angular offset relation is permitted between the shaft 10 and shaft part 11 without uncovering any portion of the universal joint.

We claim:

1. Shielding mechanism for the combination of a pair of rotating shafts joined together by a universally articulated joint, the mechanism comprising: a pair of shield tube means around the shafts and extending axially thereof with adjacent ends terminating at the joint; bearing means between the tube means and the respective shafts for permitting relative rotation therebetween; a bell-shaped shield on the end of one tube means and partially overlying the joint; a bell-shaped shield on the end of the other tube means and partially overlying the joint, the shields being of spherical sections formed about a common point with one of the shields being adapted to move internally of the other; and a third shield of a spherical section that includes its major circle and is formed about the same point, the third section being disposed between and adapted to shift in respect to the aforesaid shields and having opposite edges adapted to engage the ends of the respective tube means.

2. A shielding device for a universally articulated joint connecting two rotatable members comprising: a first spherical shield section enclosing a portion of the joint and mounted concentrically with and to articulate with the first of the rotatable members about the joint; a second spherical shield section enclosing a portion of the joint and mounted concentrically with and to articulate with the second of the rotatable members about the joint, the first and second shield sections opening to and extending toward one another to terminal annular edges that are adjacent to one another when the rotatable members are axially aligned, with the second of the shield sections being smaller than the first to permit the second section to shift internally of the first section; and a third spherical shield section disposed within the radial gap between the outer surface of the second shield section and the inner surface of the first shield section, with at least a portion of the third section overlying the second section and shiftable relative thereto and with at least a portion of the third section underlying the first section and shiftable relative thereto.

3. The structure as set forth in claim 2 in which the first and second sections have their adjacent annular edges substantially radially aligned when the rotatable members are aligned axially and in which the third section is adapted to close the spherical gap between the annular edges as the members articulate out of axial alignment.

4. An enclosure device for a universally articulated joint and two rotatable members comprising: elongated and axially extending tubes formed about the rotatable members and including journal means between the tubes and membes respectively with the tubes terminating at ends adjacent and on opposite sides of the joint, a nestled arrangement of spherical sections formed about the same center including inner and outer sections fixed to articulate about the joint with the respective rotatable members, the inner and outer sections being mounted to articulate with the respective members by being fixed to the ends of the respective tubes and opening to and extending toward one another, an intermediate spherical section having a spherical expanse of approximately 60° between opposite parallel edges and disposed between the inner and outer sections, said intermediate section slidably engaging both the outer surface of the inner section and the inner surface of the outer section, and the ends of the respective tubes are adapted to control and shift the intermediate section about the center of the nestled sections.

References Cited

UNITED STATES PATENTS

| 2,015,688 | 10/1935 | Ney | 64—3 X |
| 2,627,734 | 2/1953 | Willard | 64—32 X |
| 2,772,550 | 12/1956 | Harrington | 64—4 |
| 3,357,206 | 12/1967 | Christie | 64—6 |

FOREIGN PATENTS

| 1,006,461 | 1/1952 | France. |

OTHER REFERENCES

Schroter et al., Germany application No. 1,102,501, pub. March 1961, class 64–30.

HALL C. COE, Primary Examiner